US011622386B2

(12) United States Patent
Takahashi et al.

(10) Patent No.: US 11,622,386 B2
(45) Date of Patent: Apr. 4, 2023

(54) TERMINAL APPARATUS, BASE STATION APPARATUS, AND COMMUNICATION METHOD

(71) Applicants: Sharp Kabushiki Kaisha, Sakai (JP); FG Innovation Company Limited, Tuen Mun (HK)

(72) Inventors: Hiroki Takahashi, Sakai (JP); Shohei Yamada, Sakai (JP); Hidekazu Tsuboi, Sakai (JP); Kazunari Yokomakura, Sakai (JP)

(73) Assignees: FG Innovation Company Limited, Hong Kong (HK); Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 16/474,270

(22) PCT Filed: Dec. 6, 2017

(86) PCT No.: PCT/JP2017/043844
§ 371 (c)(1),
(2) Date: Jun. 27, 2019

(87) PCT Pub. No.: WO2018/123483
PCT Pub. Date: Jul. 5, 2018

(65) Prior Publication Data
US 2020/0128586 A1 Apr. 23, 2020

(30) Foreign Application Priority Data
Dec. 28, 2016 (JP) .............................. JP2016-255321

(51) Int. Cl.
H04W 74/08 (2009.01)
H04W 24/10 (2009.01)
(Continued)

(52) U.S. Cl.
CPC ....... *H04W 74/0833* (2013.01); *H04W 24/10* (2013.01); *H04W 72/1231* (2013.01); *H04W 72/1284* (2013.01)

(58) Field of Classification Search
CPC ............. H04W 74/0833; H04W 24/10; H04W 72/1231; H04W 72/1284
(Continued)

(56) References Cited

U.S. PATENT DOCUMENTS

2012/0034921 A1    2/2012 Anigstein et al.
2016/0174124 A1    6/2016 Basu Mallick et al.
(Continued)

FOREIGN PATENT DOCUMENTS

EP    3244684 A1    11/2007
JP    2009159214 A    7/2009
(Continued)

OTHER PUBLICATIONS

Islam et al.; "Transmit Request for Beam Tracking"; U.S. Appl. No. 62/341,051; filed May 24, 2016.
(Continued)

Primary Examiner — Kwang B Yao
Assistant Examiner — Xuan Lu
(74) Attorney, Agent, or Firm — Imperium Patent Works

(57) ABSTRACT

A terminal apparatus includes: a measurement unit configured to measure a first radio link quality based on at least part of a plurality of reference signals and a second radio link quality based on at least part of the plurality of reference signals in a certain serving cell; and a processing unit configured to trigger a report in a case that the first radio link quality and the second radio link quality satisfy a predetermined condition.

6 Claims, 9 Drawing Sheets

(51) Int. Cl.
*H04W 72/12* (2009.01)
*H04W 36/06* (2009.01)
*H04W 36/00* (2009.01)
*H04W 36/08* (2009.01)
*H04W 36/24* (2009.01)
*H04W 16/28* (2009.01)

(58) Field of Classification Search
USPC .......................................................... 370/330
See application file for complete search history.

(56) References Cited

U.S. PATENT DOCUMENTS

| | | | |
|---|---|---|---|
| 2016/0212706 A1* | 7/2016 | Kahtava | H04W 36/30 |
| 2016/0353510 A1* | 12/2016 | Zhang | H04B 7/0617 |
| 2017/0048826 A1 | 2/2017 | Kishiyama | H04W 72/04 |
| 2017/0302355 A1* | 10/2017 | Islam | H04B 7/0695 |
| 2018/0007574 A1* | 1/2018 | Park | H04B 17/382 |
| 2018/0146402 A1* | 5/2018 | Seo | H04W 40/12 |
| 2019/0181969 A1* | 6/2019 | Zhang | H04B 17/336 |
| 2020/0052765 A1 | 2/2020 | Islam et al. | |

FOREIGN PATENT DOCUMENTS

| | | |
|---|---|---|
| JP | 2015041818 A | 3/2015 |
| JP | 2016-531493 | 10/2016 |
| WO | 2008135231 A1 | 11/2008 |
| WO | 2015036173 A1 | 3/2015 |
| WO | 2015166840 A1 | 11/2015 |
| WO | 2016111221 A1 | 7/2016 |

OTHER PUBLICATIONS

Official Communication issued in International Patent Application No. PCT/JP2017/043844, dated Feb. 27, 2018.
NTT Docomo, "Revision of SI: Study on New Radio Access Technology", 3GPP TSG RAN Meeting #72, RP-161214, Jun. 13-16, 2016, 8 pages.
Nokia et al., "Basic principles for the 5G New Radio access technology", 3GPP TSG-RAN WG1 #84bis, R1-162883, Apr. 11-15, 2016, 6 pages.
Intel Corporation, "Overview of antenna technology for new radio interface", 3GPP TSG-RAN WG1 #84bis, R1-162380, Apr. 11-15, 2016, pp. 1-3.
Ericsson, "Overview of NR", TSG-RAN WG1 #84bis, R1-163215, Apr. 11-15, 2016, 2 pages.
Nokia et al., "Beam Recovery in NR", 3GPP TSG-RAN WG1#87, R1-1612865, Nov. 14-18, 2016, 4 pages.
Nokia et al., "Downlink Mobility Measurements in Connected Mode", 3GPP TSG-RAN WG2 Meeting #96, R2-167711, Nov. 14-18, 2016, 6 pages.
InterDigital Communications, "Beam-based aspects for New Radio", 3GPP TSG-RAN WG2 #95-BIS, R2-167137, Oct. 10-14, 2016, pp. 1-3.
MediaTek Inc., "RLM and RLF in HF NR", 3GPP TSG-RAN WG2 Meeting #96, R2-168130, Nov. 14-18, 2016, 5 pages.
Nokia, Alcatel-Lucent Shanghai Bell, "Beam Recovery in NR", 3GPP TSG-RAN WG1 #87 R1-1612865, Reno, USA, Nov. 14, 2016, section 2 (4 pages).
Nokia, Alcatel-Lucent Shanghai Bell, "Downlink Mobility Measurements in Connected Mode", 3GPP TSG-RAN WG2 #96 R2167711, Reno, USA, Nov. 14, 2016, section 3 (6 pages).
Interdigital Communications, "Beam-based aspects for New Radio", 3GPP TSG-RAN WG2 #95bis R2-167137, Kaohsiung, Taiwan Oct. 10, 2016, section 3 (4 pages).
Media Tek Inc., "RLM and RLF in HF NR", 3GPP TSG-RAN WG2 #96 R2-168130, Reno, USA, Nov. 14, 2016, section 2 (5 pages).
Office action of the Indian Patent Office in foreign related application IN201917025489 dated Jan. 27, 2022 (5 pages).
Office action of the Indonesian Patent Office in foreign related application ID201905452 dated Dec. 6, 2021 (2 pages).

* cited by examiner

TERMINAL APPARATUS, BASE STATION APPARATUS, AND COMMUNICATION METHOD

TECHNICAL FIELD

The present invention relates to a terminal apparatus, a base station apparatus, and a communication method.

This application claims priority based on JP 2016-255321 filed on Dec. 28, 2016, the contents of which are incorporated herein by reference.

BACKGROUND ART

The Third Generation Partnership Project (3GPP) is currently working on technical studies and standard formulation for Long Term Evolution (LTE)-Advanced Pro and New Radio technology (NR) as radio access schemes and wireless network technologies for fifth generation cellular systems (NPL1).

The fifth-generation cellular system requires three anticipated scenarios for services: enhanced Mobile BroadBand (eMBB) which realizes high-speed, high-capacity transmission, Ultra-Reliable and Low Latency Communication (URLLC) which realizes low-latency, high-reliability communication, and massive Machine Type Communication (mMTC) that allows a large number of machine type devices to be connected in a system such as Internet of Things (IoT).

For the NR, technical studies are in progress for massive Multiple-Input Multiple-Output (MIMO) that uses a large number of antenna elements at high frequencies to guarantee coverage with a beamforming gain (NPL 2, NPL 3, and NPL 4).

CITATION LIST

Non Patent Literature

NPL 1: RP-161214, NTT DOCOMO, "Revision of SI: Study on New Radio Access Technology", June 2016

NPL 2: R1-162883 Nokia, Alcatel-Lucent ShanghaiBell, "April Basic Principles for the 5 G New Radio Access technology", April 2016

NPL 3: R1-162380, Intel Corporation, "Overview of antenna technology for new radio interface", April 2016

NPL 4: R1-163215, Ericsson, "Overview of NR", April 2016

SUMMARY OF INVENTION

Technical Problem

An aspect of the present invention provides a terminal apparatus capable of efficiently communicating with a base station apparatus, a base station apparatus communicating with the terminal apparatus, a communication method used for the terminal apparatus, and a communication method used for the base station apparatus. For example, the communication methods used for the terminal apparatus and the base station apparatus may include an uplink transmission method, a modulation method, and/or a coding method for achieving efficient communications, reducing complexity, and reducing interference between cells and/or between terminal apparatuses.

Solution to Problem (1) According to some aspects of the present invention, the following measures are provided. That is, a first aspect of the present invention is a terminal apparatus including: a measurement unit configured to measure a first radio link quality based on at least part of a plurality of reference signals and a second radio link quality based on at least part of the plurality of reference signals in a certain serving cell; and a processing unit configured to trigger a report in a case that the first radio link quality and the second radio link quality satisfy a predetermined condition.

(2) A second aspect of the present invention is a base station apparatus including: a transmitter configured to transmit a plurality of reference signals in a certain serving cell; and a receiver configured to receive a random access preamble by a random access procedure triggered by the terminal apparatus in a case that a predetermined condition is satisfied by a first radio link quality based on at least part of the plurality of reference signals and a second radio link quality based on at least part of the plurality of reference signals.

(3) A third aspect of the present invention is a communication method used for a terminal apparatus, the communication method including the steps of: measuring a first radio link quality based on at least part of a plurality of reference signals and a second radio link quality based on at least part of the plurality of reference signals in a certain serving cell; and triggering a report in a case that the first radio link quality and the second radio link quality satisfy a predetermined condition.

(4) A fourth aspect of the present invention is a communication method used for a base station apparatus, the communication method including the steps of: transmitting a plurality of reference signals in a certain serving cell; and receiving a random access preamble by a random access procedure triggered by a terminal apparatus in a case that a predetermined condition is satisfied by a first radio link quality based on at least part of the plurality of reference signals and a second radio link quality based on at least part of the plurality of reference signals.

Advantageous Effects of Invention

According to an aspect of the present invention, a terminal apparatus and a base station apparatus can communicate with each other efficiently and/or in a less complex manner.

DESCRIPTION OF EMBODIMENTS

Embodiments of the present invention will be described below.

LTE (and LTE-Advanced Pro) and NR may be defined as different Radio Access Technologies (RATs). NR may be defined as a technology included in LTE. The present embodiment may be applied to NR, LTE and other RATs. Terms associated with LTE are used in the following description. However, the present invention may be applied to other technologies using other terms.

Figure 1:
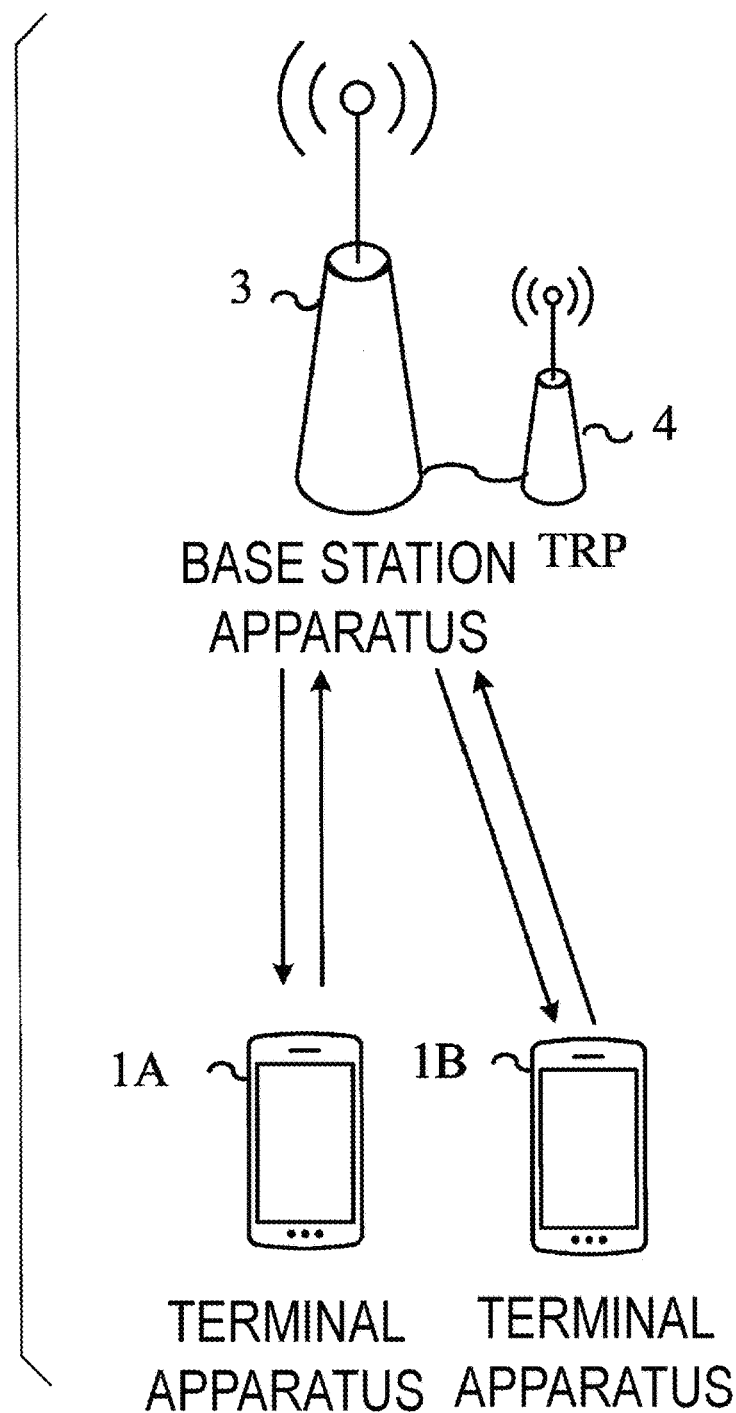
FIG. 1 is a conceptual diagram of a radio communication system according to an embodiment of the present invention.

FIG. 1 is a conceptual diagram of a radio communication system according to an embodiment of the present embodiment. In FIG. 1, the radio communication system includes a terminal apparatus 1A, a terminal apparatus 1B, and a base station apparatus 3. The terminal apparatus 1A and the terminal apparatus 1B are also referred to as a terminal apparatus 1.

The terminal apparatus 1 may also be referred to as a mobile station device, User Equipment (UE), a communication terminal, a mobile device, a terminal, and a Mobile Station (MS). The base station apparatus 3 may also be referred to as a radio base station apparatus, a base station, a radio base station, a fixed station, a Node B (NB), an evolved Node B (eNB), NR Node B (NR NB), next generation Node B (gNB) an access point, a Base Transceiver Station (BTS), and a Base Station (BS). The base station apparatus 3 may include a core network apparatus. Furthermore, the base station apparatus 3 may include one or more Transmission Reception Points 4 (TRPs). At least some of the functions/processes of the base station apparatus 3 described below may be functions/processes at each of the transmission reception points 4 in the base station apparatus 3. The base station apparatus 3 may configure a coverage (communicable area), controlled by the base station apparatus 3, to have one or more cells to serve the terminal apparatus 1. The base station apparatus 3 may also configure a coverage (communicable area), controlled by one or more transmission reception points 4, to have one or more cells to serve the terminal apparatus 1. The base station apparatus 3 may also divide one cell into multiple beamed areas to serve the terminal apparatus 1 in each of the beamed areas. Here, a beamed area may be identified based on a beam index used for beamforming or a precoding index.

The communication area covered by the base station apparatus 3 may vary in size and shape for each frequency. Moreover, the covered area may vary for each frequency. A radio network, in which cells having different types of base station apparatuses 3 and different cell radii coexist at the same frequency or different frequencies to form a single communication system, is referred to as a heterogeneous network.

A radio communication link from the base station apparatus 3 to the terminal apparatus 1 is referred to as a downlink. A radio communication link from the terminal apparatus 1 to the base station apparatus 3 is referred to as an uplink. A radio communication link from the terminal apparatus 1 to another terminal apparatus 1 is referred to as a sidelink.

In FIG. 1, in a radio communication between the terminal apparatus 1 and the base station apparatus 3, and/or a radio communication between the terminal apparatus 1 and another terminal apparatus 1, Orthogonal Frequency Division Multiplexing (OFDM) including a Cyclic Prefix (CP), Single-Carrier Frequency Division Multiplexing (SC-FDM), Discrete Fourier Transform Spread OFDM (DFT-S-OFDM), or Multi-Carrier Code Division Multiplexing (MC-CDM) may be used.

Furthermore, in FIG. 1, in the radio communication between the terminal apparatus 1 and the base station apparatus 3, and/or the radio communication between the terminal apparatus 1 and another terminal apparatus 1, Universal-Filtered Multi-Carrier (UFMC), Filtered OFDM (F-OFDM), Windowed OFDM, or Filter-Bank Multi-Carrier (FBMC) may be used.

Note that the present embodiment will be described by using OFDM symbol with the assumption that a transmission scheme is OFDM, and use of any other transmission scheme is also included in an aspect of the present invention. For example, the OFDM symbol in the present embodiment may be SC-FDM symbols (which may also be referred to as Single-Carrier Frequency Division Multiple Access (SC-FDMA)) symbols.

Furthermore, in FIG. 1, in the radio communication between the terminal apparatus 1 and the base station apparatus 3, and/or the radio communication between the terminal apparatus 1 and another terminal apparatus 1, the CP may not be used, or the above-described transmission scheme with zero padding may be used instead of the CP. Moreover, the CP or zero passing may be added both forward and backward.

According to the present embodiment, one or more serving cells are configured for the terminal apparatus 1. A plurality of configured serving cells includes one primary cell and at least one of the plurality of secondary cells. The primary cell is a serving cell in which an initial connection establishment procedure has been performed, a serving cell in which a connection re-establishment procedure has been initiated, or a cell indicated as a primary cell during a handover procedure. One or more secondary cells may be configured at a point of time when or after a Radio Resource Control (RRC) connection is established.

Time Division Duplex (TDD) and/or Frequency Division Duplex (FDD) may be applied to the radio communication system according to the present embodiment. A time division duplex (TDD) scheme or a frequency division duplex (FDD) scheme may be applied to all the multiple cells. Cells to which the TDD scheme is applied and cells to which the FDD scheme is applied may be aggregated.

A carrier corresponding to a serving cell in the downlink is referred to as a downlink component carrier (or a downlink carrier). A carrier corresponding to a serving cell in the uplink is referred to as an uplink component carrier (or an uplink carrier). A carrier corresponding to a serving cell in the sidelink is referred to as a sidelink component carrier (or a sidelink carrier). The downlink component carrier, the uplink component carrier, and/or the sidelink component carrier are collectively referred to as a component carrier (or a carrier).

Physical channels and physical signals according to the present embodiment will be described. Note that the downlink physical channels and/or the downlink physical signals may be collectively referred to as downlink signals. The uplink physical channels and/or the uplink physical signals may be collectively referred to as uplink signals. The downlink physical channels and/or the uplink physical channels may be collectively referred to as a physical channel. The downlink physical signals and/or the uplink physical signals may be collectively referred to as physical signals.

In FIG. 1, the following physical channels are used for the radio communication between the terminal apparatus 1 and the base station apparatus 3. The physical channels are used for transmission of information output from a higher layer.

Physical Broadcast CHannel (PBCH)
Physical Control CHannel (PCCH)
Physical Shared CHannel (PSCH)
Physical Random Access CHannel (PRACH)

The PBCH is used by the base station apparatus 3 to broadcast essential information block, such as Master Information Block (MIB) and Essential Information Block (EIB), which includes essential information needed by the terminal apparatus 1. Here, one or more essential information blocks may be transmitted as an essential information message. For example, the essential information block may include information (e.g., information about the location in a superframe including multiple frames) indicating a part or the entirety of the frame number (System Frame Number(SFN)). For example, a radio frame (10 ms) includes 10 subframes (1 ms), and is identified by a frame number. The frame number is wrapped around by 1024. Furthermore, in a case that different essential information blocks are transmitted in the respective areas within the cell, each essential information block may include information for identifying the corresponding area (for example, identifier information about a base station transmission beam constituting the area). Here, the identifier information of the base station transmission beam may be indicated using the index of the base station transmission beam (precoding). In a case that different essential information blocks (essential information messages) are transmitted in the respective areas within the cell, information for identifying the position in a frame in time (a subframe number including the essential information block (essential information message), for example) may be included. Thus, information may be included for determining each of subframe numbers for transmitting respective essential information blocks (essential information messages) using indices of different base station transmission beams. Moreover, the essential information may include information needed for connection to the cell or for mobility.

The PCCH is used to transmit Uplink Control Information (UCI) in a case of uplink radio communication (radio communication from the terminal apparatus 1 to the base station apparatus 3). Here, the uplink control information may include Channel State Information (CSI) used to indicate a downlink channel state. The uplink control information may include Scheduling Request (SR) used to request an UL-SCH resource. The uplink control information may include Hybrid Automatic Repeat reQuest ACKnowledgment (HARQ-ACK). The HARQ-ACK indicated may be a HARQ-ACK for downlink data (Transport block, Medium Access Control Protocol Data Unit (MAC PDU), or Downlink-Shared CHannel (DL-SCH)).

The PCCH is used to transmit downlink control information (DCI) in a case of downlink radio communication (radio communication from the base station apparatus 3 to the terminal apparatus 1). Here, one or more pieces of DCI (which may be referred to as DCI formats) are defined for transmission of the downlink control information. In other words, a field for the downlink control information is defined as DCI and is mapped to information bits.

For example, the DCI may be defined to include information for indicating whether a signal included in a scheduled PSCH corresponds to downlink radio communication or uplink radio communication.

For example, the DCI may be defined to include information for indicating a downlink transmission period included in a scheduled PSCH.

For example, the DCI may be defined to include information for indicating an uplink transmission period included in a scheduled PSCH.

For example, the DCI may be defined to include information for indicating a timing for transmitting HARQ-ACK with respect to a scheduled PSCH (for example, the number of symbols from the last symbol included in the PSCH to the symbol for transmission of the HARQ-ACK).

For example, the DCI may be defined to include information for indicating a downlink transmission period, a gap, and an uplink transmission period included in a scheduled PSCH.

For example, the DCI may be defined to be used for the scheduling of a downlink radio communication PSCH in a cell (transmission of a downlink transport block).

For example, the DCI may be defined to be used for the scheduling of an uplink radio communication PSCH in a cell (transmission of an uplink transport block).

Here, the DCI includes information about the scheduling of the PSCH in a case that the PSCH includes the uplink or the downlink. Here, the DCI for the downlink is also referred to as downlink grant or downlink assignment. Here, the DCI for the uplink is also referred to as uplink grant or uplink assignment.

The PSCH is used to transmit uplink data (Uplink Shared CHannel (UL-SCH)) or downlink data (Downlink Shared CHannel (DL-SCH)) from Medium Access Control (MAC). Furthermore, for the downlink, the PSCH is used to transmit System Information (SI), Random Access Response (PAR), and the like. For the uplink, the PSCH may be used to transmit the HARQ-ACK and/or CSI along with the uplink data. Furthermore, the PSCH may be used to transmit the CSI only or the HARQ-ACK and CSI only. In other words, the PSCH may be used to transmit the UCI only.

Here, the base station apparatus 3 and the terminal apparatus 1 exchange (transmit and/or receive) signals with each other in their respective higher layers. For example, the base station apparatus 3 and the terminal apparatus 1 may transmit and receive radio resource control (RRC) signaling (also referred to as RRC message or RRC information) in the RRC layer, respectively. The base station apparatus 3 and the terminal apparatus 1 may transmit and receive a Medium Access Control (MAC) control element in a MAC layer, respectively. Here, the RRC signaling and/or the MAC control element is also referred to as higher layer signaling. This higher layer means a higher layer relative to a physical layer, and thus may include one or more of a MAC layer, an RRC layer, an RLC layer, a PDCP layer, a NAS layer, and the like. For example, a higher layer in processing in a MAC layer may include one or more of an RRC layer, an RLC layer, a PDCP layer, a NAS layer, and the like.

The PSCH may also be used to transmit the RRC signaling and the MAC control element. Here, the RRC signaling transmitted from the base station apparatus 3 may be signaling common to multiple terminal apparatuses 1 in a cell. The RRC signaling transmitted from the base station apparatus 3 may be signaling dedicated to a certain terminal apparatus 1 (also referred to as dedicated signaling). In other words, terminal apparatus-specific (UE-specific) information may be transmitted through signaling dedicated to the certain terminal apparatus 1. The PSCH may be used to transmit UE capabilities in the uplink.

Although the same designations PCCH and PSCH are commonly used for the downlink and the uplink, different channels may be defined for the downlink and for the uplink. For example, a downlink shared channel may be referred to as a Physical Downlink Shared CHannel (PDSCH). For example, an uplink shared channel may be referred to as a Physical Uplink Shared CHannel (PUSCH). A downlink control channel may be referred to as a Physical Downlink Control CHannel (PDCCH). An uplink control channel may be referred to as a Physical Uplink Control CHannel (PUCCH).

The PRACH may be used to transmit a random access preamble. The PRACH is used for indicating the initial connection establishment procedure, the handover procedure, the connection re-establishment procedure, synchronization (timing adjustment) for uplink transmission, and a request for an uplink PSCH (UL-SCH) resource.

In FIG. 1, the following downlink physical signals are used for downlink radio communication. Here, the downlink physical signals are not used to transmit the information output from the higher layers but is used by the physical layer.

Synchronization Signal (SS)
Reference Signal (RS)

The synchronization signal is used for the terminal apparatus 1 to take synchronization in the frequency domain and the time domain in the downlink. The synchronization signal may include a Primary Synchronization Signal (PSS) and a Secondary Synchronization Signal (SSS). The synchronization signal may be used for the terminal apparatus 1 to identify a cell IDentifier (cell ID). The synchronization signal may also be used to select/identify/determine a base station transmission beam to be used by the base station apparatus 3 for downlink beamforming, and/or a terminal reception beam to be used by the terminal apparatus 1. In other words, the synchronization signal may be used to allow the terminal apparatus 1 to select/identify/determine the index of the base station transmission beam applied to the downlink signal by the base station apparatus 3.

The downlink reference signal (hereinafter, also simply referred to as a reference signal in the present embodiment) may be classified into a plurality of reference signals based on applications and the like. For example, one or more of the following reference signals may be used for the reference signal.

Demodulation Reference Signal (DMRS)
Channel State Information Reference Signal (CSI-RS)
Phase Tracking Reference Signal (PTRS)
Mobility Reference Signal (MRS)

The DMRS may be used for channel compensation at the time of demodulation of the received modulated signal. DMRS for demodulating PSCH, DMRS for demodulating PCCH, and/or DMRS for demodulating PBCH may be collectively referred to as DMRS, or may be individually defined.

CSI-RS may be used for channel state measurement. PTRS may be used for phase tracking based on a movement of the terminal and the like. MRS may be used to measure reception quality from multiple base station apparatuses for handovers.

A reference signal for compensating for phase noise may also be defined as the reference signal.

However, functions of at least some of the plurality of reference signals may be provided to other reference signals.

At least one of the plurality of reference signals described above or the other reference signals may be defined as a Cell-specific reference signal (CRS) individually set for a cell, a Beam-specific reference signal (BRS) for each transmission beam used by the base station apparatus 3 or the transmission reception point 4, and/or a UE-specific reference signal (URS) individually set to the terminal apparatus 1.

Furthermore, at least one of the reference signals may be used for a numerology for a radio parameter, subcarrier spacing, or the like, or may be used for fine synchronization sufficient to achieve FFT window synchronization.

At least one of the reference signals may be used for Radio Resource Measurement (RRM). At least one of the reference signals may be used for beam management.

A synchronization signal may be used for at least one of the reference signals.

The subframe will be described below. The subframe in the embodiment may also be referred to as a resource unit, a radio frame, a time period, or a time interval.

Figure 2:
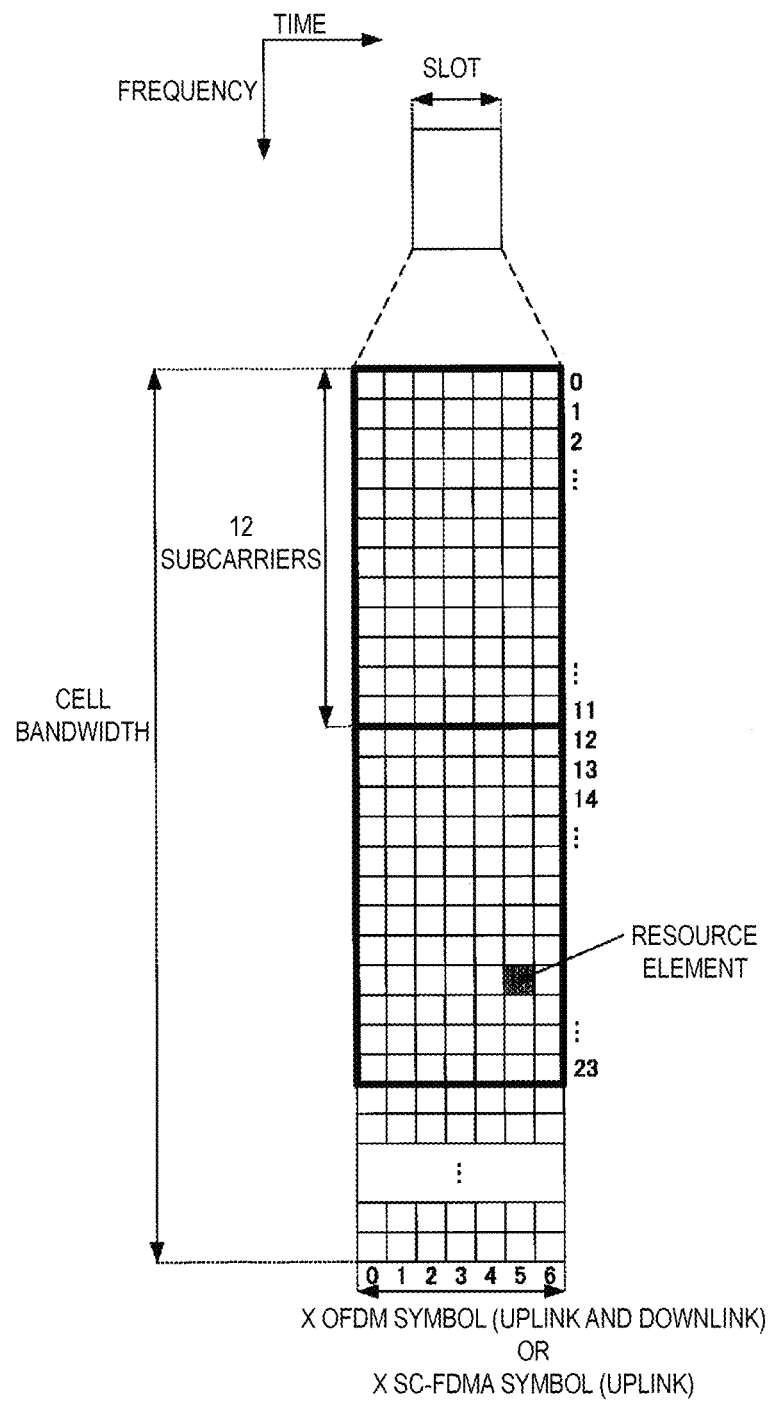
FIG. 2 is a diagram illustrating a schematic configuration of a downlink slot according to an embodiment of the present invention.

FIG. 2 is a diagram illustrating a schematic configuration of a downlink slot according to the present embodiment. Each of the radio frames is 10 ms in length. Each of the radio frames is constituted of 10 subframes and X slots. In other words, each subframe has a length of 1 ms. The length of each of the slots is defined by subcarrier spacing. For example, in a case of Normal Cyclic Prefix (NCP) with the subcarrier spacing of OFDM symbols being 15 kHz, X is 7 or 14 respectively corresponding to 0.5 ms or 1 ms. In addition, in a case that the subcarrier spacing is 60 kHz, X is 7 or 14 respectively corresponding to 0.125 ms or 0.25 ms. FIG. 2 illustrates an example of a case that X is 7. Note that the case can be similarly extended to a case that X is 14. The uplink slot may be defined similarly, and the downlink slot and the uplink slot may be defined separately from one another.

The signal or the physical channel transmitted in each of the slots may be expressed by a resource grid. The resource grid is defined by a plurality of subcarriers and a plurality of OFDM symbols. The number of subcarriers constituting one slot depends on a cell bandwidth in each of an uplink and a downlink. Each element within the resource grid is referred to as a resource element. The resource element may be identified by a subcarrier number and an OFDM symbol number.

A resource block is used to express mapping of a certain physical downlink or uplink channel (such as the PDSCH or the PUSCH) to resource elements. For the resource block, a virtual resource block and a physical resource block are defined. A certain physical uplink channel is first mapped to a virtual resource block. Thereafter, the virtual resource block is mapped to the physical resource block. In the case of NCP with the number of OFDM symbols X included in a slot being 7, one physical resource block is defined by seven consecutive OFDM symbols in the time domain and by 12 consecutive subcarriers in the frequency domain. Hence, one physical resource block includes (7×12) resource elements. In a case of Extended CP (ECP), one physical resource block is defined by six consecutive OFDM symbols in the time domain and by 12 consecutive subcarriers in the frequency domain. Hence, one physical resource block includes (6×12) resource elements. In this case, one physical resource block corresponds to one slot in the time domain and corresponds to 180 kHz in the frequency domain. Physical resource blocks are numbered from 0 in the frequency domain.

Figure 3:
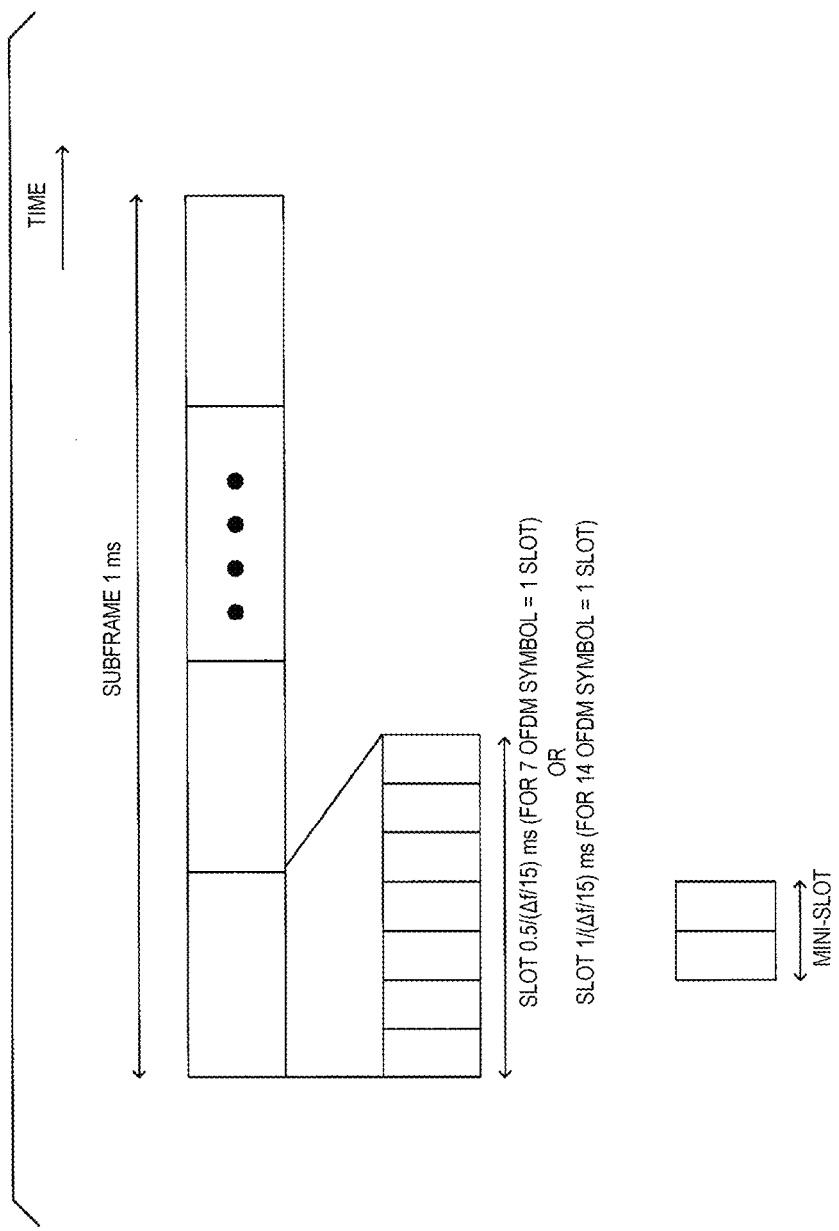
FIG. 3 is a diagram illustrating relationship among a subframe, a slot, and a mini-slot in a time domain, according to an embodiment of the present invention.

A subframe, a slot, and a mini-slot will now be described. FIG. 3 is a diagram illustrating the relationship among a subframe, a slot, and a mini-slot in a time domain. As illustrated in the figure, three types of time units are defined.

The subframe is 1 ms regardless of the subcarrier spacing, whereas the slot includes 7 or 14 OFDM symbols and has a slot length depending on the subcarrier spacing. Specifically, in a case that the subcarrier spacing is 15 kHz, a single subframe includes 14 OFDM symbols. Thus, in a case that the subcarrier spacing is $\Delta f$ (kHz), the slot length may be defined as $0.5/(\Delta f/15)$ ms in a case that a single slot includes seven OFDM symbols. This $\Delta f$ may be defined by subcarrier spacing (kHz). The slot length may be defined as $1/(\Delta f/15)$ ms in a case that a single slot includes seven OFDM symbols. This $\Delta f$ may be defined by subcarrier spacing (kHz). Furthermore, the slot length may be defined as $X/14/(\Delta f/15)$ ms, where X is the number of OFDM symbols in a slot.

The mini-slot (which may be referred to as a sub-slot) is a time unit including OFDM symbols of which the number is less than the number of OFDM symbols included in the slot. The figure illustrates an example of a case that the mini-slot is constituted of 2 OFDM symbols. The OFDM symbols in the mini-slot and the OFDM symbols in the slot may match in timing. Note that a slot or mini-slot may be the minimum scheduling unit.

Figure 4:
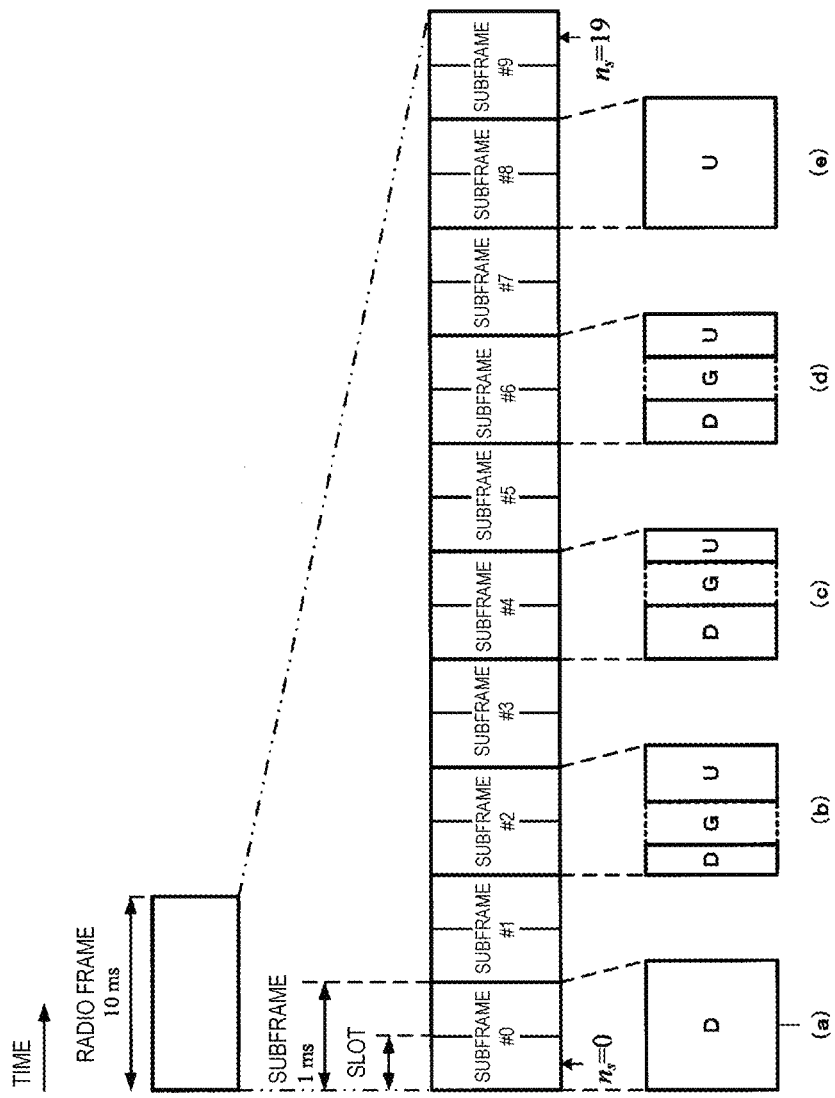
FIG. 4 is a diagram illustrating an example of a slot or a subframe according to an embodiment of the present invention.

FIG. 4 illustrates an example of a slot or a subframe. Here, an example of a case is illustrated in which the slot length is 0.5 ms with the subcarrier interval being 15 kHz. In the figure, D represents the downlink, and U represents the uplink. As illustrated in the figure, during a certain time interval (for example, the minimum time interval to be allocated to a UE in the system), the subframe may include one or more of the followings:

a downlink part (duration);
a gap; and
an uplink part (duration).

Part (a) of FIG. 4 illustrates an example in which the entire subframe is used for downlink transmission during a certain time interval (for example, a minimum time resource unit that can be allocated to a UE, which may also be referred to as a time unit. Furthermore, a combination of a plurality of minimum time resource units may be referred to as a time unit). Part (b) of FIG. 4 illustrates an example in which an uplink is scheduled via a PCCH for example by using the first time resource, and an uplink signal is transmitted after a gap for a processing delay of the PCCH, a time for switching from a downlink to an uplink, and generation of a transmit signal. Part (c) of FIG. 4 illustrates an example in which a downlink PCCH and/or downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the HARQ-ACK and/or CSI, namely, the UCI. Part (d) of FIG. 4 illustrates an example in which a downlink PCCH and/or a downlink PSCH are transmitted by using the first time resource, and a PSCH or PCCH is transmitted after a gap for a processing delay, a time for switching from a downlink to an uplink, and generation of a transmit signal. Here, for example, the uplink signal may be used to transmit the uplink data, namely, the UL-SCH. Part (e) of FIG. 4 illustrates an example in which the entire subframe is used for uplink transmission (uplink PSCH or PCCH).

The above-described downlink part and uplink part may be constituted of multiple OFDM symbols as is the case with LTE.

Beamforming, beamforming, beam management and/or beam weaving according to embodiments of the present invention will be described.

The beamforming on a transmission side (the base station apparatus 3 in a case of downlink and the terminal apparatus 1 in a case of an uplink) is a method of controlling an analog or digital amplitude/phase for each of a plurality of transmission antenna elements to transmit a signal with a high transmission antenna gain in a desired direction, and a relevant field pattern is referred to as a transmission beam. The beamforming on a reception side (the terminal apparatus 1 in a case of downlink and the base station apparatus 3 in a case of an uplink) is processing involving controlling an analog or digital amplitude/phase for each of a plurality of reception antenna elements to receive a signal with a high transmission antenna gain in a desired direction, and a field pattern involved in this method is referred to as a reception beam. Beam management may be an operation performed by the base station apparatus 3 and/or the terminal apparatus 1 for directivity alignment for the transmission beam and/or reception beam and for obtaining a beam gain.

Figure 5:
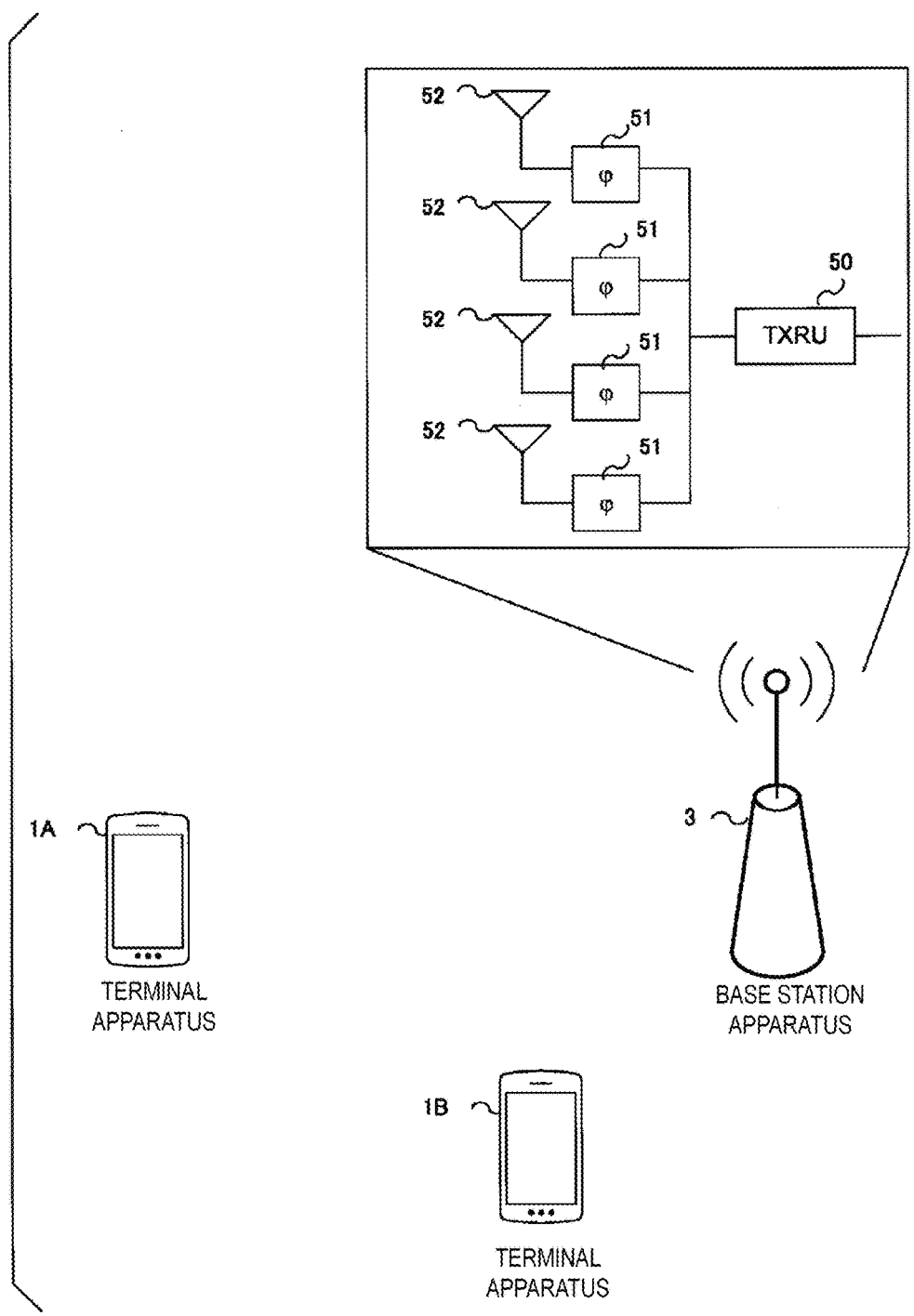
FIG. 5 is a diagram illustrating an example of beamforming according to an embodiment of the present invention.

FIG. 5 illustrates an example of the beamforming. A plurality of antenna elements are connected to a single transmitter (Transceiver unit (TXRU)) 50, and a beam can be directed to a desired direction for a transmission signal with the antenna elements 52 performing transmission with a phase shifter 51 of each of the antenna elements performing phase control. Typically, the TXRU 50 may be defined as an antenna port, and only the antenna port may be defined in the terminal apparatus 1. The directivity in a desired direction can be obtained by controlling the phase shifter 51, whereby the base station apparatus 3 can communicate with the terminal apparatus 1 using a beam with a high gain.

The beamforming may also be referred to as virtualization, precoding, weight multiplication, and the like. A signal itself transmitted with the beamforming may be simply referred to as a transmission beam.

In the present embodiment, a transmission beam used by the terminal apparatus 1 in the beamforming for uplink transmission is referred to as an uplink transmission beam (UL Tx beam), and a reception beam used by the base station apparatus 3 in the beamforming for uplink reception is referred to as an uplink reception beam (UL Rx beam). A transmission beam used by the base station apparatus 3 in the beamforming for downlink transmission is referred to as a downlink transmission beam (DL Tx beam), and a reception beam used by the terminal apparatus 1 in the beamforming for downlink reception is referred to as a downlink reception beam (DL Rx beam). Note that the uplink transmission beam and the uplink reception beam may be collectively referred to as an uplink beam, and the downlink transmission beam and the downlink reception beam may be collectively referred to as a downlink beam. Note also that processing performed by the terminal apparatus 1 for uplink beamforming may be referred to as uplink transmission beam processing or uplink precoding, and processing performed by the base station apparatus 3 for uplink beamforming may be referred to as uplink reception beam processing. Note also that processing performed by the terminal apparatus 1 for downlink beamforming may be referred to as downlink reception beam processing, and processing performed by the base station apparatus 3 for downlink beamforming may be referred to as downlink transmission beam processing or downlink precoding.

The base station apparatus 3 may transmit a signal using a plurality of downlink transmission beams with a single OFDM symbol. For example, an antenna element of the base station apparatus 3 may be divided into sub-arrays, and the downlink beamforming may be differently performed among the sub-arrays. A polarized antenna may be used and the downlink beamforming may be differently performed among polarized waves. Similarly, the terminal apparatus 1 may transmit a signal by using a plurality of uplink transmission beams with a single OFDM symbol.

Note that in the present embodiment, the base station apparatus 3 in a cell including the base station apparatus 3 and/or the transmission reception point 4 uses a downlink transmission beam by switching among a plurality of downlink transmission beams, but a cell may be individually formed for each downlink transmission beam.

The beam management may include the following operations.

Beam selection
Beam refinement
Beam recovery

For example, the beam selection may be an operation of selecting a beam in communication between the base station apparatus 3 and the terminal apparatus 1. The beam refinement may be an operation of selecting a beam with a higher gain, or an operation of changing the optimum beam between the base station apparatus 3 and the terminal apparatus 1 in response to a movement of the terminal apparatus 1. The beam recovery may be an operation of reselecting a beam in response to degradation of the quality of a communication link for communications between the base station apparatus 3 and the terminal apparatus 1, as a result of blockage due to a shielding object or a person passing by.

For example, the terminal apparatus 1 may select a transmission beam for the base station apparatus 3, by using a reference signal (CSI-RS for example), or Quasi Co-Location (QCL) assumption.

In a case that a Long Term Property of a channel for conveying a certain symbol in a certain antenna port can be inferred from a channel for conveying a certain symbol in another antenna port, these two antenna ports are said to be quasi co-located. The Long Term Property of a channel includes one or more of delay spread, Doppler spread, Doppler shift, average gain, and average delay. For example, an antenna port 1 and an antenna port 2 that are quasi co-located in terms of average delay indicate that the reception timing of the antenna port 2 may be inferred from the reception timing of the antenna port 1.

This QCL may be extended for the beam management. Thus, a QCL extended to space may be newly defined. Examples of the Long Term Property of a channel in spatial QCL assumption may include an Angle of Arrival (AoA) or a Zenith angle of Arrival (ZoA), an Angle Spread (an Angle Spread of Arrival (ASA) or a Zenith angle Spread of Arrival (ZSA) for example), an Angle of Delivery (AoD or ZoD for example) and their Angle Spreads (for example, Angle Spread of Departure (ASD), Zenith angle Spread of Departure (ZSS)), and Spatial Correlation in a wireless link or a channel.

Thus, an operation of the base station apparatus 3 and the terminal apparatus 1 equivalent to the beam management based on spatial QCL assumption and wireless resource (time and/or frequency) may be defined as the beam management.

Note that an antenna port may be allocated to each precoding or transmission beam. For example, a signal transmitted by using different precoding or a different transmission beam according to the present embodiment may be defined as a signal transmitted through at least one antenna port that is different. Note that the antenna port is defined as follows. Specifically, a channel over which a certain symbol is transmitted with a certain antenna port can be inferred from a channel over which another symbol is transmitted with the same antenna port. The same antenna port may be an antenna port with the same number (the number for identifying an antenna port). A plurality of antenna ports may form an antenna port set. The same antenna port may be an antenna port set with the same number (the number for identifying an antenna port set). Transmission of a signal by applying a different terminal transmission beam may be transmission of a signal using a different antenna port or a different antenna port set including a plurality of antenna ports. Each beam index may be an OFDM symbol number, an antenna port number, or an antenna port set number.

In transform precoding, a complex modulation symbol for one or a plurality of layers generated by layer mapping is input. The transform precoding may be processing involving dividing a complex number symbol block into sets for respective layers corresponding to a single OFDM symbol. In a case that the OFDM is used, Discrete Fourier Transform (DFT) processing in the transform precoding may not be required. Precoding may be processing involving generating a vector block to be mapped to a resource element, with a vector block obtained from a transform precoder used as an input. In a case of spatial multiplexing, one precoding matrix may be applied in generating the vector block to be mapped to the resource element. This processing may be referred to as digital beamforming. The precoding may be defined to include analog beamforming and digital beamforming, and may be defined as digital beamforming. The beamforming may be applied to a precoded signal, or the precoding may be applied to a signal to which the beamforming has been applied. The beamforming may include the analog beamforming and not including the digital beamforming, or may include both the digital beamforming and the analog beamforming. A signal after beamforming, precoding, or beamforming and precoding may be referred to as a beam. An index of a beam may be an index of a precoding matrix. A beam index and a precoding matrix index may be independently defined. A signal may be generated with a precoding matrix indicated by the precoding matrix index applied to a beam indicated by the beam index. A signal may be generated with the beamforming indicated by a beam index applied to a signal to which a precoding matrix indicated by the precoding matrix index has been applied. The digital beamforming may be processing involving applying different precoding matrices to a resource (a subcarrier set for example) in a frequency direction.

Note that in this embodiment, a radio link configured with a given transmission beam and/or a given reception beam may be referred to as a single radio link. For example, in the downlink, a radio link configured with a different downlink transmission beam and/or a different downlink reception beam may be referred to as a different downlink radio link. For example, in the uplink, a radio link configured with a different uplink transmission beam and/or a different uplink reception beam may be referred to as a different uplink radio link. For example, a state in which the terminal apparatus 1 may receive downlink signals using a plurality of downlink transmission beams and/or a plurality of downlink reception beams in a certain cell may be referred to as a state with a plurality of downlink radio links. For example, a state in which the terminal apparatus 1 may transmit uplink signals using a plurality of uplink transmission beams and/or a plurality of uplink reception beams in a certain cell may be referred to as a state with a plurality of uplink radio links.

The concept of the downlink radio link according to the present embodiment will be described.

Figure 6:
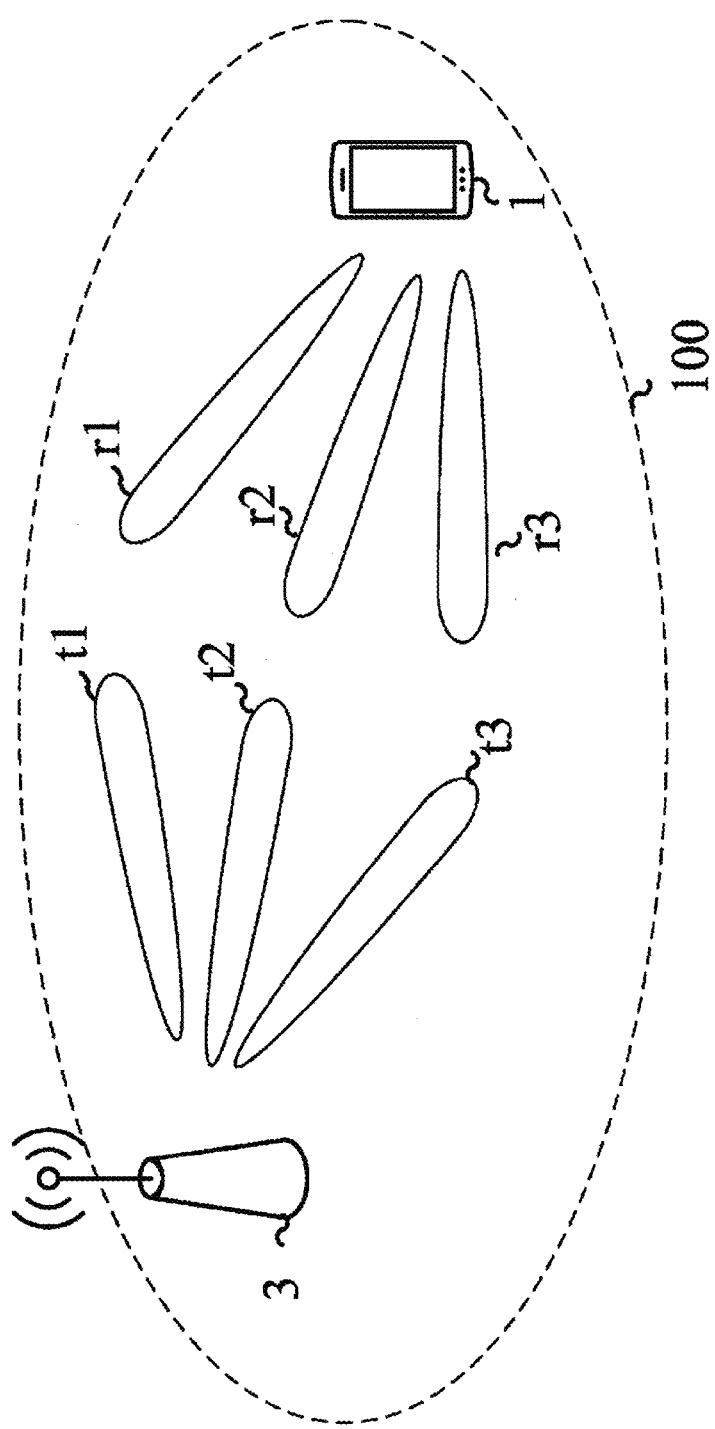
FIG. 6 is a diagram illustrating a concept in which a plurality of reference signals to which a transmission beam is applied are transmitted in one or a plurality of cells, according to an embodiment of the present invention.

FIG. 6 illustrates a case in which the terminal apparatus 1 and the base station apparatus 3 configure a plurality of downlink radio links in a cell 100. As a first downlink radio link, the terminal apparatus 1 receives, by using a downlink reception beam r1, a downlink signal transmitted from the base station apparatus 3 by using a downlink transmission beam t1. As a second downlink radio link, the terminal apparatus 1 receives, by using a downlink reception beam r2, a downlink signal transmitted from the base station apparatus 3 by using a downlink transmission beam t2. As a third downlink radio link, the terminal apparatus 1 receives, by using a downlink reception beam r3, a downlink signal transmitted from the base station apparatus 3 by using a downlink transmission beam t3. In this case, three downlink radio links are configured between the terminal apparatus 1 and the base station apparatus 3, and downlink transmission and reception are performed on all or part of the three downlink radio links. For example, the terminal apparatus 1 measures the received power and/or reception quality with a reference signal on each downlink radio link.

Note that for a single downlink transmission beam, a plurality of downlink radio links may be configured using a plurality of downlink reception beams. Note that for a single downlink reception beam, a plurality of downlink radio links may be configured using a plurality of downlink transmission beams.

Note that although in the description of the present embodiment, a downlink radio link is configured by each down link transmission beam and/or each downlink reception beam in the case that the terminal apparatus 1 and the base station apparatus 3 use multiple downlink transmission beams and/or multiple downlink reception beams in a single cell, only a single downlink wireless link may be configured in a certain cell. For example, the terminal apparatus 1 may measure a plurality of received powers and/or reception qualities with a plurality of reference signals on a single downlink radio link.

Figure 7:
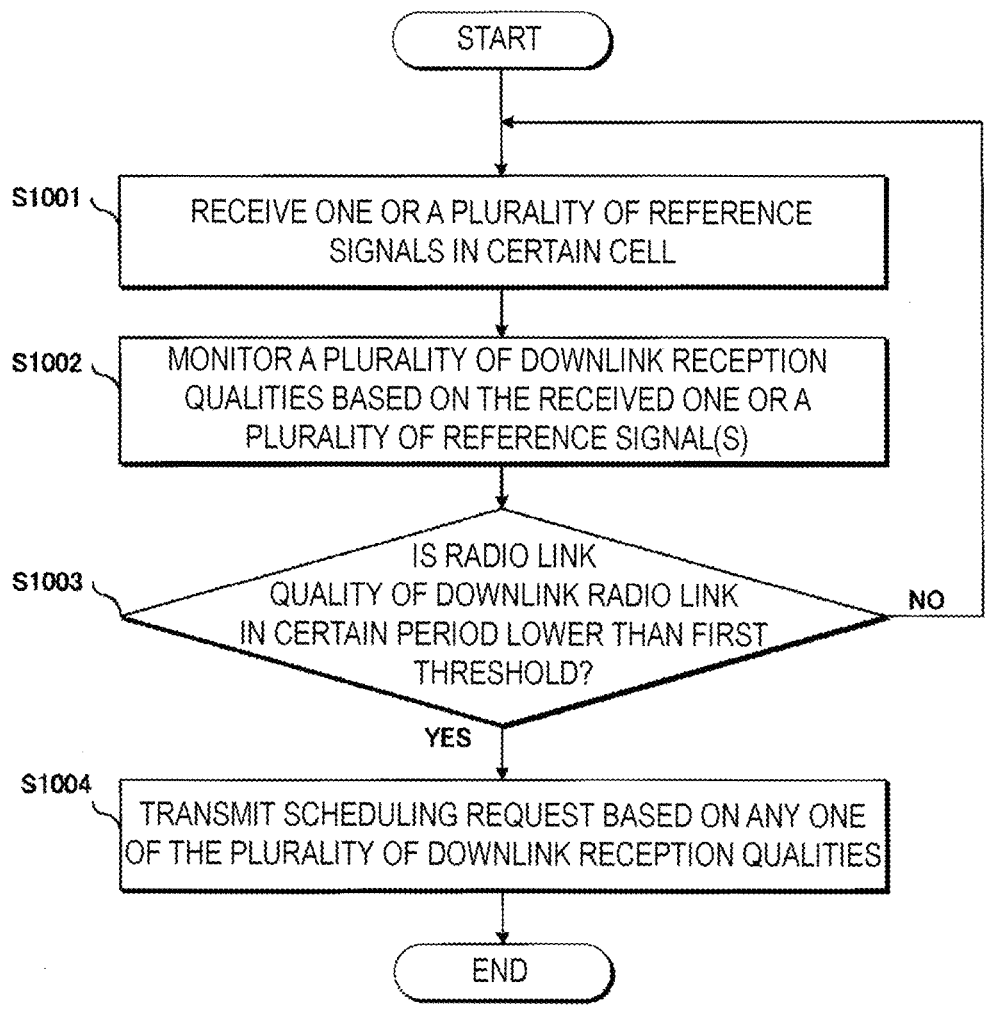
FIG. 7 is a flowchart illustrating an example of radio link monitoring by a terminal apparatus 1 according to an embodiment of the present invention.

Radio link monitoring by the terminal apparatus 1 will be described below. FIG. 7 is a flowchart illustrating an example of the radio link monitoring by a terminal apparatus 1 according to the present embodiment.

In step S1001 in FIG. 7, the terminal apparatus 1 receives one or a plurality of reference signals of a cell (e.g., PCell, PSCell, or a serving cell). Note that different reference signals may correspond to different downlink radio links. For example, the terminal apparatus 1 may receive one or a plurality of reference signals corresponding to a plurality of downlink radio links in a certain cell.

In step S1002 in FIG. 7, the terminal apparatus 1 monitors a plurality of downlink reception qualities (which may also be referred to as link quality) based on one or a plurality of reference signals received. For example, the terminal apparatus 1 receiving a plurality of reference signals for which a plurality of downlink transmission beams and/or a plurality of downlink reception beams in a certain cell may monitor the downlink reception quality (which may also be referred to as downlink beam quality, for example) for each of the downlink transmission beams and/or downlink reception beams. Alternatively, the terminal apparatus 1 receiving a plurality of reference signals for which a plurality of downlink transmission beams and/or a plurality of downlink reception beams in a certain cell may monitor the downlink reception quality based on at least one of the plurality of reference signals.

Note that the terminal apparatus 1 may monitor only part of a plurality of downlink reception qualities based on one or a plurality of reference signals received in a cell. Note that the terminal apparatus 1 may monitor only a reception quality indicated by a MAC layer in a plurality of downlink reception qualities based on one or a plurality of reference signals received in a cell.

In step S1003 in FIG. 7, the terminal apparatus 1 estimates the downlink radio link quality of a certain cell in order to monitor the downlink radio link quality of the cell, and compares the estimation result with a first threshold (Qout) and/or a second threshold (Qin). For example, the terminal apparatus 1 may estimate a link quality of one downlink radio link in which RRC is established in a cell, and compare the estimation result with the first threshold (Qout) and/or the second threshold (Qin). For example, the terminal apparatus 1 may estimate each of a plurality of downlink reception qualities (e.g., downlink beam qualities) based on a plurality of reference signals of a certain cell, and compare each estimation result with the threshold Qout and/or Qin.

The threshold Qout may be defined as a level with which a downlink radio link cannot be reliably received and a block error rate of hypothetical downlink control channel transmission (transmission including (considering) a bundling size set to the terminal apparatus 1 in a case that the terminal apparatus 1 is a specific type of terminal apparatus (a second or a third type for example)) becomes 10%.

The threshold Qin may be defined as a level with which a downlink radio link quality (or a downlink reception quality based on a certain reference signal) corresponding to sufficiently more reliable reception compared with the state of Qout, and a block error rate of hypothetical downlink control channel transmission (transmission including (considering) a bundling size set to the terminal apparatus 1 in a case that the terminal apparatus 1 is a specific type of terminal apparatus (a second or a third type for example)) becomes 2%.

The physical layer of the terminal apparatus 1 issues a notification indicating "out-of-sync" to a higher layer in a case that all the downlink reception qualities (which may be downlink radio link qualities) monitored in a certain cell are estimated to be equal to or lower than the threshold Qout over the last certain period TEvaluete_Qout (200 ms for example).

In step S1003 in FIG. 7, in a case that the terminal apparatus 1 estimates that the radio link quality of a certain downlink radio link in a certain cell (which may be, for example, a radio link in which RRC is established) is equal to or lower than the threshold Qout over the last certain period (period A) (S1003—Yes), the terminal apparatus 1 transmits a scheduling request based on any one of a plurality of downlink reception qualities monitored in the cell (S1004). Note that the scheduling request based on any one of a plurality of downlink reception qualities may be transmission of scheduling request using any one of radio resources associated with a plurality of respective reference signals received in a certain cell. For example, the terminal apparatus 1 may transmit the scheduling request by using a radio resource associated with a reference signal corresponding to the best reception quality among the plurality of downlink reception qualities monitored in the cell. For example, in a case that the terminal apparatus 1 monitors at least a first downlink reception quality and a second downlink reception quality in a certain cell, the terminal apparatus 1 performs communication in a radio link based on the first downlink reception quality in the cell, the first downlink reception quality is equal to or lower than the threshold Qout over the last certain period (period A), and the second downlink reception quality is equal to or higher than the threshold Qin over the last certain period (period B), the terminal apparatus 1 may transmit a scheduling request by using a radio resource associated with a reference signal corresponding to the second downlink reception quality.

Note that the scheduling request according to the present embodiment may be a request for transmission of PDSCH and/or PDCCH. For example, a resource associated with a reference signal corresponding to a certain downlink reception quality may be a request for transmission of PDSCH and/or PDCCH using a downlink transmission beam corresponding to the reference signal.

Note that the scheduling request according to the present embodiment may be transmitted by a random access procedure. For example, a resource associated with a reference signal corresponding to a certain downlink reception quality may be a random access resource for transmitting a random access preamble.

Transmission of a scheduling request corresponding to one of the downlink reception quality(s) may include activating an uplink physical channel and/or a signal corresponding to one of the downlink reception quality(s) and transmitting the scheduling request by using the activated uplink physical control channel or a physical random access channel.

Rather than directly triggering the transmission of the scheduling request, an uplink scheduling request may be triggered in response to triggering of a certain report based on monitoring of a radio link quality (transmitted with a MAC control element). The uplink physical channel and/or a signal may be activated in response to triggering of the report based on monitoring of a radio link quality (sent with a MAC control element).

However, in a case that the corresponding downlink signal cannot be detected within a certain (period C) after the scheduling request has been transmitted, the physical layer of the terminal apparatus 1 may issue the notification indicating "out-of-sync" to a higher layer.

Note that in a case that the corresponding downlink signal cannot be detected within the certain period (period C) after the transmitted scheduling request has been transmitted, the scheduling request may be transmitted by using a resource associated with a reference signal corresponding to another downlink reception quality monitored in the cell. However, the physical layer of the terminal apparatus 1 may issue the notification indicating "out-of-sync" to a higher layer in a case that the scheduling request is transmitted for a predetermined times after a radio link quality of a certain downlink radio link in a certain cell has been estimated to be equal to or lower than the threshold Qout over the last certain period (period A) but a downlink signal corresponding to the scheduling requests fails to be received.

Furthermore, the physical layer of the terminal apparatus 1 may issue a notification indicating "in-sync" to a higher layer in a case that a reception quality of at least one of a plurality of downlink reception qualities monitored in a certain cell is estimated to be equal to or higher than the threshold Qin over a last certain period TEvaluate_Qin (100 ms for example). Note that the physical layer of the terminal apparatus 1 preferably transmits the notification indicating out-of-sync or in-sync to the higher layer after a certain interval TReport_sync (10 ms for example) or more.

The higher layer of the terminal apparatus 1 starts or restarts counting of a timer (T310) in a case that out-of-sync is consecutively received a predetermined number of times (N310). The higher layer of the terminal apparatus 1 stops the counting of the timer (T310) in a case that in-sync is consecutively received a predetermined number of times (N311). The higher layer of the terminal apparatus 1 may implement transmission to an idle state or an RRC connection reestablishment procedure in a case that the counting of the timer (T310) expires without stopping.

In the case that the timer (T310) expires, the terminal apparatus 1 may perform a random access procedure for the same cell, another cell formed by the same base station 3, or a cell formed by another base station apparatus 3, to maintain the RRC connection state and avoid the transition to the idle state.

The above described example corresponds to a case that no Discontinuous Reception (DRX) is configured for the terminal apparatus 1. In a case that DRX is configured for the terminal apparatus 1, the higher layer of the terminal apparatus may be configured to have a period in which the downlink radio link quality is measured and/or an interval of the notification from the physical layer to the upper layer that are different from the period and/or the interval in a case that no DRX is configured. Note that even in a case that DRX is configured, while the counting of the timer (T310) is in progress, the period in which the downlink radio link quality is measured and/or the interval of the notification from the physical layer to the upper layer may be a value that is the same as that in the case that no DRX is configured.

Furthermore, some or all of the timer (T310), threshold (Qin, Qout), the number of times (N310, N311), the period (TEvaluate_Qout, TEvaluate_Qin), and the interval (TReport_sync) may be a predefined value, notified from the base station apparatus 3 as notification information and the like as system information for a certain type of terminal apparatus for example, individually configured for the terminal apparatus 1 with an RRC message and the like, or may employ a combination of these.

Furthermore, the parameters such as the timer, threshold, and the number of times may be each set to be different between a certain type of terminal apparatus and other terminal apparatuses. In such a case, the certain type of terminal apparatus and the other terminal apparatus may have different options for selecting the value. For example, as a range of selective values of a timer such as T310, a range of 0 ms to 2000 ms is made available to the certain type of terminal apparatus, whereas a range of 0 ms to T ms is made available to the other terminal apparatuses (T>2000). As a result, different types of terminal apparatuses can be introduced while mitigating the effects on existing procedures.

Configurations of apparatuses according to the present embodiment will be described below.

Figure 8:
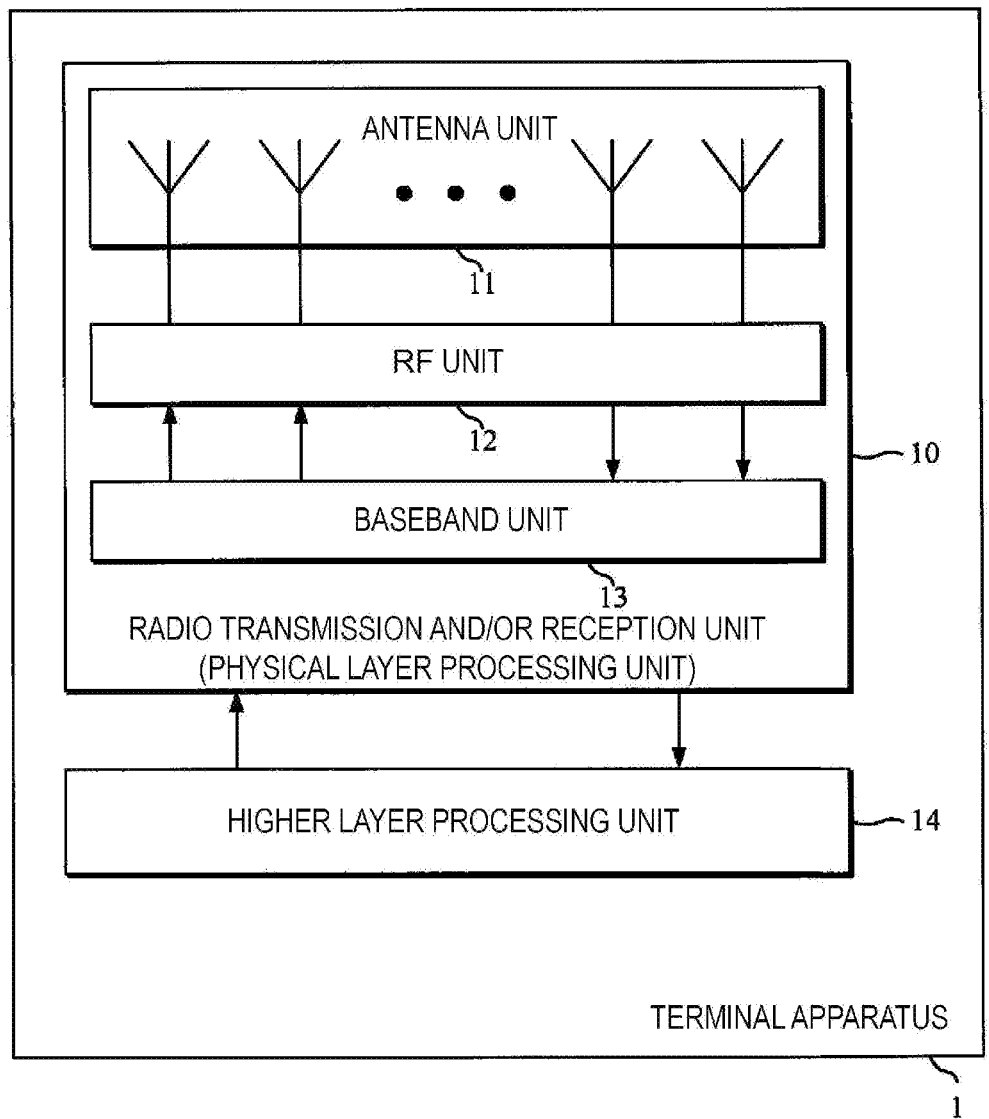
FIG. 8 is a schematic block diagram illustrating a configuration of the terminal apparatus 1 according to an embodiment of the present embodiment.

FIG. 8 is a schematic block diagram illustrating a configuration of the terminal apparatus 1 in the present embodiment. As illustrated, the terminal apparatus 1 is configured to include a radio transmission and/or reception unit 10 and a higher layer processing unit 14. The radio transmission and/or reception unit 10 is configured to include an antenna unit 11, a radio frequency (RF) unit 12, and a baseband unit 13. The radio transmission and/or reception unit 10 is also referred to as a transmitter, a receiver or a physical layer processing unit. The higher layer processing unit 14 is also referred to as a measurement unit or a control unit.

The higher layer processing unit 14 outputs uplink data (may also be referred to as a transport block) generated by a user operation or the like, to the radio transmission and/or reception unit 10. The higher layer processing unit 14 performs processing for some or all of the Medium Access Control (MAC) layer, the Packet Data Convergence Protocol (PDCP) layer, the Radio Link Control (RLC) layer, and the Radio Resource Control (RRC) layer.

The higher layer processing unit 14 controls transmission of a scheduling request, based on various types of configuration information/parameters.

The higher layer processing unit 14 manages various types of configuration information/parameters of its own apparatus. The higher layer processing unit 14 sets various types of configuration information/parameters based on higher layer signaling received from the base station apparatus 3. Namely, the higher layer processing unit 14 sets the various configuration information/parameters in accordance with the information indicating the various configuration information/parameters received from the base station apparatus 3. The higher layer processing unit 14 may have a function of monitoring one or a plurality of downlink reception qualities received by the radio transmission and/or reception unit 10.

The radio transmission and/or reception unit 10 performs processing involving the physical layer, such as modulation, demodulation, coding, decoding, and the like. The radio transmission and/or reception unit 10 demultiplexes, demodulates, and decodes a signal received from the base station apparatus 3, and outputs the information resulting from the decoding to the higher layer processing unit 14. The radio transmission and/or reception unit 10 generates a transmit signal by modulating and coding data, and performs transmission to the base station apparatus 3. The radio transmission and/or reception unit 10 may have a function of receiving information for identifying configurations of a plurality of reference signals in a certain cell. The radio transmission and/or reception unit 10 may have a function of receiving a plurality of reference signals. The radio transmission and/or reception unit 10 may have a function of transmitting a scheduling request based on any one of the plurality of downlink reception link qualities.

The RF unit 12 converts (down-converts) a signal received via the antenna unit 11 into a baseband signal by orthogonal demodulation and removes unnecessary frequency components. The RF unit 12 outputs the processed analog signal to the baseband unit.

The baseband unit 13 converts the analog signal input from the RF unit 12 into a digital signal. The baseband unit 13 removes a portion corresponding to a Cyclic Prefix (CP) from the digital signal resulting from the conversion, performs Fast Fourier Transform (FFT) of the signal from which the CP has been removed, and extracts a signal in the frequency domain.

The baseband unit 13 generates an OFDM symbol by performing Inverse Fast Fourier Transform (IFFT) of the data, attaches the CP to the generated OFDM symbol, generates a baseband digital signal, and converts the baseband digital signal into an analog signal. The baseband unit 13 outputs the analog signal resulting from the conversion, to the RF unit 12.

The RF unit 12 removes unnecessary frequency components from the analog signal input from the baseband unit 13 using a low-pass filter, up-converts the analog signal into a signal of a carrier frequency, and transmits the up-converted signal via the antenna unit 11. Furthermore, the RF unit 12 amplifies power. The RF unit 12 may include a function of determining the transmitted power of the uplink signal and/or the uplink channel transmitted in the serving cell. The RF unit 12 is also referred to as a transmit power control unit.

Figure 9:
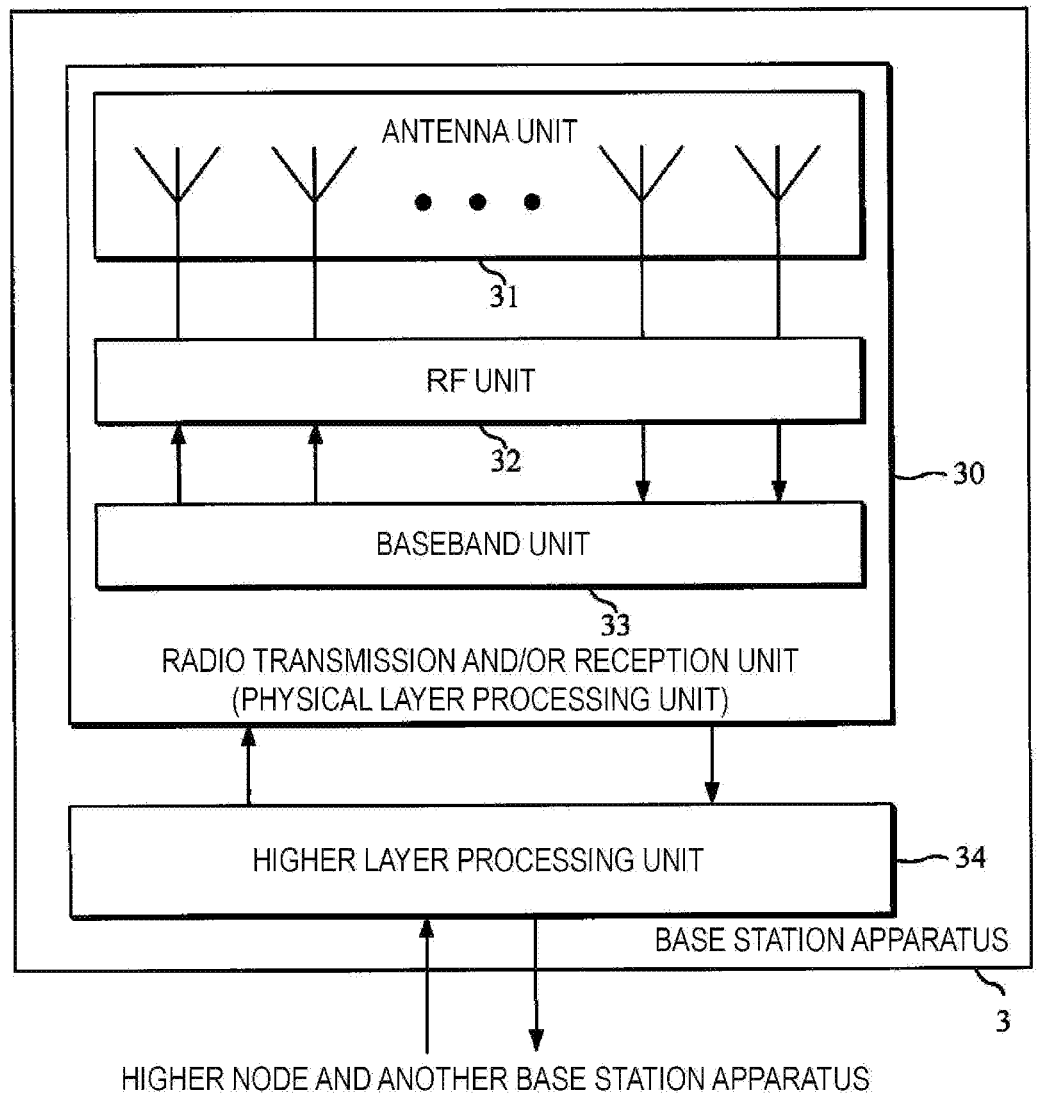
FIG. 9 is a schematic block diagram illustrating a configuration of a base station apparatus 3 according to an embodiment of the present embodiment.

FIG. 9 is a schematic block diagram illustrating a configuration of the base station apparatus 3 in the present embodiment. As illustrated, the base station apparatus 3 is configured to include a radio transmission and/or reception unit 30 and a higher layer processing unit 34. The radio transmission and/or reception unit 30 is configured to include an antenna unit 31, an RF unit 32, and a baseband unit 33. The radio transmission and/or reception unit 30 is also referred to as a transmitter, a receiver or a physical layer processing unit. A controller controlling operations of the units based on various conditions may be separately provided. The higher layer processing unit 34 is also referred to as a terminal control unit.

The higher layer processing unit 34 performs processing for some or all of the Medium Access Control (MAC) layer, the Packet Data Convergence Protocol (PDCP) layer, the Radio Link Control (RLC) layer, and the Radio Resource Control (RRC) layer.

The higher layer processing unit 34 performs processing associated with a scheduling request, based on various types of configuration information/parameters.

The higher layer processing unit 34 generates, or acquires from a higher node, downlink data (transport block) allocated on a physical downlink shared channel, system information, an RRC message, a MAC Control Element (CE), and the like, and outputs the generated or acquired data to the radio transmission and/or reception unit 30. Furthermore, the higher layer processing unit 34 manages various types of configuration information/parameters for each of the terminal apparatuses 1. The higher layer processing unit 34 may set various types of configuration information/parameters for each of the terminal apparatuses 1 via the higher layer signal. Namely, the higher layer processing unit 34 transmits/broadcasts information indicating various types of configuration information/parameters. The higher layer processing unit 34 transmits/broadcasts information for identifying a configuration of a plurality of reference signals in a certain cell.

The radio transmission and/or reception unit 30 has a function of transmitting a plurality of reference signals. The terminal apparatus may also have a function of receiving a scheduling request transmitted by using any one of a plurality of scheduling request resources configured by the higher layer processing unit 34. The radio transmission and/or reception unit 30 may have a function of receiving information for identifying configurations of a plurality of reference signals in a certain cell. A part of the functionality of the radio transmission and/or reception unit 30 is similar to the functionality of the radio transmission and/or reception unit 10, and hence description thereof is omitted. Note that, in a case that the base station apparatus 3 is connected to one or a plurality of transmission reception points 4, some or all of the functions of the radio transmission and/or reception unit 30 may be included in each of the transmission reception points 4.

The higher layer processing unit 34 transmits (transfers) or receives control messages or user data between the base station apparatuses 3, or between a higher-node network device (MME or Serving-GW (S-GW)) and the base station apparatus 3. Although, in FIG. 9, other constituent elements of the base station apparatus 3, a transmission path of data (control information) between the constituent elements, and the like are omitted, it is apparent that the base station apparatus 3 is provided with multiple blocks, as constituent elements, including other functions necessary to operate as the base station apparatus 3. For example, a Radio Resource Management layer processing unit or an Application layer processing unit exists in the higher layer processing unit 34. The higher layer processing unit 34 may also have a function of configuring a plurality of scheduling request resources corresponding to a plurality of respective reference signals transmitted from the radio transmission and/or reception unit 30.

The "units" in the drawing refer to constituent elements to provide the functions and the procedures of the terminal apparatus 1 and the base station apparatus 3. Such a constituent element may be represented by different terms such as a section, a circuit, a constituting device, a device, a unit, and the like.

Each of the units having the reference signs 10 to 16 included in the terminal apparatus 1 may be configured as a circuit. Each of the units having the reference signs 30 to 36 included in the base station apparatus 3 may be configured as a circuit.

Aspects of the terminal apparatus 1 and the base station apparatus 3 according to the present embodiment will be described below.

(1) A first aspect of the present invention is a terminal apparatus 1 including a receiver 10 configured to receive one or a plurality of reference signals from a base station apparatus 3, a measurement unit 14 configured to monitor one or a plurality of downlink reception qualities based on the one or plurality of reference signals received, and a transmitter 10 configured to transmit, in a case that a first downlink radio link quality based on one of the one or plurality of downlink reception qualities is lower than a first threshold for a certain period of time, a scheduling request corresponding to the one of the one or plurality of downlink reception qualities.

(2) In the first aspect of the present invention, the scheduling request may be transmitted by using a random access preamble in a random access procedure.

(3) In the first aspect of the present invention, the scheduling request may be transmitted by using a physical uplink control channel resource.

(4) A second aspect of the present invention is a terminal apparatus 1 including a receiver 10 configured to receive one or a plurality of reference signals corresponding to a plurality of downlink radio links in a certain cell from a base station apparatus 3, a measurement unit 14 configured to monitor a plurality of radio link qualities of the plurality of downlink radio links based on the one or plurality of reference signals received, and a transmission unit 10 configured to transmit, in a case that a radio link quality of a first downlink radio link that is one of the plurality of downlink radio links is lower than a first threshold for a certain period of time, a scheduling request corresponding to a second downlink radio link that is one of the plurality of downlink radio links.

(5) In the second aspect of the present invention, a radio link quality of the second downlink radio link may be higher than a second threshold for a certain period of time.

(6) A third aspect of the present invention is a base station apparatus 3 including a transmission unit 30 configured to transmit a plurality of reference signals to a terminal apparatus 1, a configuring unit 34 configured to configure a plurality of scheduling request resources corresponding to the plurality of respective reference signals for the terminal apparatus 1, and a receiver 30 that receives a scheduling request transmitted by using any one of the plurality of scheduling request resources.

(7) In the third aspect of the present invention, each of the scheduling request resources may be a resource used for reception of a random access preamble in a random access procedure.

(8) In the third aspect of the present invention, each of the scheduling request resources, each of the scheduling request resources may be a physical uplink control channel resource.

(A1) An aspect of the present invention is a terminal apparatus including: a measurement unit configured to measure a first radio link quality based on at least part of a plurality of reference signals and a second radio link quality based on at least part of the plurality of reference signals in a certain serving cell; and a processing unit configured to trigger a report in a case that the first radio link quality and the second radio link quality satisfy a predetermined condition.

(A2) In an aspect of the present invention, the predetermined condition is satisfied with the first radio link quality being lower than a first threshold and the second radio link quality being higher than a second threshold.

(A3) In an aspect of the present invention, a receiver is further included that is configured to determine whether a physical downlink control channel associated with a reference signal corresponding to the second radio link quality is detectable within a certain period.

(A4) An aspect of the present invention is a base station apparatus including: a transmitter configured to transmit a plurality of reference signals in a certain serving cell; and a receiver configured to receive a random access preamble by a random access procedure triggered by the terminal apparatus in a case that a predetermined condition is satisfied by a first radio link quality based on at least part of the plurality of reference signals and a second radio link quality based on at least part of the plurality of reference signals.

(A5) In an aspect of the present invention, the predetermined condition is satisfied with the first radio link quality being lower than a first threshold and the second radio link quality being higher than a second threshold.

(A6) An aspect of the present invention is a communication method used for a terminal apparatus, the communication method including the steps of: measuring a first radio link quality based on at least part of a plurality of reference signals and a second radio link quality based on at least part of the plurality of reference signals in a certain serving cell; and triggering a report in a case that the first radio link quality and the second radio link quality satisfy a predetermined condition.

(A7) An aspect of the present invention is a communication method used for a base station apparatus, the communication method including the steps of: transmitting a plurality of reference signals in a certain serving cell; and receiving a random access preamble by a random access procedure triggered by a terminal apparatus in a case that a predetermined condition is satisfied by a first radio link quality based on at least part of the plurality of reference signals and a second radio link quality based on at least part of the plurality of reference signals.

A program running on an apparatus according to an aspect of the present invention may serve as a program that controls a Central Processing Unit (CPU) and the like to cause a computer to operate in such a manner as to realize the functions of the embodiment according to an aspect of the present invention. Programs or the information handled by the programs are temporarily stored in a volatile memory, such as a Random Access Memory (RAM), in a non-volatile memory, such as a flash memory, in a Hard Disk Drive (HDD), or in other storage apparatus systems.

Note that a program for implementing the functions of an embodiment according to an aspect of the present invention may be recorded in a computer-readable recording medium. The functions may be implemented with a computer system reading and executing the program recorded in the recording medium. It is assumed that the "computer system" refers to a computer system built into the apparatuses, and the computer system includes an operating system and hardware components such as a peripheral device. Furthermore, the "computer-readable recording medium" may be any of a semiconductor recording medium, an optical recording medium, a magnetic recording medium, a medium dynamically holding a program in a short period of time, and other computer-readable recording media.

Furthermore, each functional block or various characteristics of the apparatuses used in the above-described embodiments may be implemented or performed on an electric circuit, that is an integrated circuit or multiple integrated circuits, for example. An electric circuit designed to perform the functions described in the present specification may include a general-purpose processor, a Digital Signal Processor (DSP), an Application Specific Integrated Circuit (ASIC), a Field Programmable Gate Array (FPGA), or other programmable logic devices, discrete gates or transistor logic, discrete hardware components, or a combination thereof. The general-purpose processor may be a microprocessor, or may be a processor of known type, a controller, a micro-controller, or a state machine instead. The above-mentioned electric circuits may be constituted of a digital circuit, or may be constituted of an analog circuit. Furthermore, in a case that with advances in semiconductor technology, a circuit integration technology appears that replaces the present integrated circuits, one or a plurality of aspects of the present invention may use new integrated circuits based on the technology.

Note that the invention of the present patent application is not limited to the above-described embodiments. In the embodiment, apparatuses have been described as an example, but the invention of the present application is not limited to these apparatuses, and is applicable to a terminal apparatus or a communication apparatus of a fixed-type or a stationary-type electronic apparatus installed indoors or outdoors, for example, an AV apparatus, a kitchen apparatus, a cleaning or washing machine, an air-conditioning apparatus, office equipment, a vending machine, and other household apparatuses.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications can be made to the aspect of the present invention within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

An aspect of the present invention can be utilized, for example, in a communication system, communication equipment (for example, a cellular phone apparatus, a base station apparatus, a radio LAN apparatus, or a sensor device), an integrated circuit (for example, a communication chip), or a program.

REFERENCE SIGNS LIST 1 (1A, 1B) Terminal apparatus
3 Base station apparatus
4 Transmission and/or reception point (TRP)
10 Radio transmission and/or reception unit
11 Antenna unit
12 RF unit
13 Baseband unit
14 Higher layer processing unit
30 Radio transmission and/or reception unit
31 Antenna unit
32 RF unit
33 Baseband unit
34 Higher layer processing unit
50 Transmission unit (TXRU)
51 Phase shifter
52 Antenna element

The invention claimed is:

1. A terminal apparatus configured to communicate with a base station apparatus, the terminal apparatus comprising:
measurement circuitry configured to measure a plurality of reception qualities including a first reception quality and a second reception quality of a serving cell, wherein the first reception quality corresponds to a first part of a plurality of reception qualities and is based on a first part of a plurality of channel state information reference signals (CSI-RS), and the second reception quality corresponds to a second part of a plurality of reception qualities and is based on a second part of the plurality of CSI-RS from the base station apparatus, and wherein the first part and the second part are different reference signals corresponding to a first downlink radio link of a first cell and a second downlink radio link of a second cell, respectively, transmitted by the base station apparatus; and
transmission circuitry configured to initiate a random access procedure upon been detecting the first reception quality is equal to or worse than a threshold Qout over a first time period, and to perform the ongoing random access procedure using a radio resource associated with the second part of the plurality of CSI-RS corresponding to the second downlink radio link based on the second reception quality, and to perform the ongoing random access procedure using another radio resource associated with an RS corresponding to another downlink radio link when the terminal apparatus does not receive a corresponding downlink signal over a second time period.

2. The terminal apparatus according to claim 1, wherein the transmission circuitry is further configured to perform the random access procedure based on a resource associated with a reference signal corresponding to the second reception quality, in a case that the first reception quality is equal to or worse than the threshold $Q_{out}$, and the second reception quality is equal to or larger than a threshold $Q_{in}$.

3. A base station apparatus configured to communicate with a terminal apparatus, the base station apparatus comprising:
transmission circuitry configured to transmit a plurality of reference signals on a serving cell, wherein a plurality of reception qualities including a first reception quality and a second reception quality of the serving cell are measured by the terminal apparatus, wherein the first reception quality corresponds to a first part of the plurality of reception qualities and is based on a first part of the plurality of channel state information reference signals (CSI-RS), and the second reception quality corresponds to a second part of the plurality of reception qualities and is based on a second part of the plurality of CSI-RS, and wherein the first part and the second part are different reference signals corresponding to a first downlink radio link of a first cell and a second downlink radio link of a second cell, respectively, transmitted by the base station apparatus; and reception circuitry configured to receive a random access preamble, in a case that a random access procedure is initiated upon been detecting the first reception quality is equal to or worse than a threshold QoUt over a first time period, and the random access procedure is ongoingly performed using a radio resource associated with the second part of the plurality of CSI-RS corresponding to the second downlink radio link based on the second reception quality, and the random access procedure is ongoingly performed using another radio resource associated with an RS corresponding to another downlink radio link when the terminal apparatus does not receive a corresponding downlink signal over a second time period.

4. The base station apparatus according to claim 3, wherein the reception circuitry is configured to receive the random access preamble based on a resource associated with a reference signal corresponding to the second reception quality, in a case that the first reception quality is equal to or worse than the threshold $Q_{out}$, and the second reception quality is equal to or larger than a threshold $Q_{in}$.

5. A communication method of a terminal apparatus configured to communicate with a base station apparatus, the communication method comprising:

measuring a plurality of reception qualities including a first reception quality and a second reception quality of a serving cell, wherein the first reception quality corresponds to a first part of the plurality of reception qualities and is based on a first part of a plurality of channel state information reference signals (CSI-RS), and the second reception quality corresponds to a second part of the plurality of reception qualities and is based on a second part of the plurality of reference signals from the base station apparatus, and wherein the first part and the second part are different CSI-RS corresponding to a first downlink radio link of a first cell and a second downlink radio link of a second cell, respectively, transmitted by the base station apparatus;

initiating a random access procedure upon been detecting the first reception quality is equal to or worse than a threshold Qout over a first time period; and performing the ongoing random access procedure using a radio resource associated with the second part of the plurality of CSI-RS corresponding to the second downlink radio link based on the second reception quality, and performing the ongoing random access procedure using another radio resource associated with an RS corresponding to another downlink radio link when the terminal apparatus does not receive a corresponding downlink signal over a second time period.

6. A communication method of a base station apparatus configured to communicate with a terminal apparatus, the base station apparatus comprising:

transmitting a plurality of reference signals on a serving cell, wherein a plurality of reception qualities including a first reception quality and a second reception quality of the serving cell are measured by the terminal apparatus, wherein the first reception quality corresponds to a first part of the plurality of reception qualities and is based on a first part of the plurality of channel state information reference signals (CSI-RS), and the second reception quality corresponds to a second part of the plurality of reception qualities and is based on a second part of the plurality of CSI-RS, and wherein the first part and the second part are different reference signals corresponding to a first downlink radio link of a first cell and a second downlink radio link of a second cell, respectively, transmitted by the base station apparatus; and receiving a random access preamble, in a case that a random access procedure is initiated upon been detecting the first reception quality is equal to or worse than a threshold Qout over a first time period, and the random access procedure is ongoingly performed using a radio resource associated with the second part of the plurality of CSI-RS corresponding to the second downlink radio link based on the second reception quality, and random access procedure is ongoingly performed using another radio resource associated with an RS corresponding to another downlink radio link when the terminal apparatus does not receive a corresponding downlink signal over a second time period.

* * * * *

UNITED STATES PATENT AND TRADEMARK OFFICE
CERTIFICATE OF CORRECTION

| | | |
|---|---|---|
| PATENT NO. | : 11,622,386 B2 | Page 1 of 1 |
| APPLICATION NO. | : 16/474270 | |
| DATED | : April 4, 2023 | |
| INVENTOR(S) | : Takahashi et al. | |

It is certified that error appears in the above-identified patent and that said Letters Patent is hereby corrected as shown below:

On the Title Page

Item [73] should now read:
Sharp Kabushiki Kaisha, Osaka (JP);
FG Innovation Company Limited,
Hong Kong (HK)

Signed and Sealed this
Twenty-fifth Day of June, 2024

Katherine Kelly Vidal
*Director of the United States Patent and Trademark Office*